United States Patent
Law

(10) Patent No.: US 7,073,693 B2
(45) Date of Patent: Jul. 11, 2006

(54) DRAWSTRINGING KIT

(75) Inventor: Thomas R. Law, Rochester Hills, MI (US)

(73) Assignee: Intier Automotive Inc., Newmarket (CA)

( * ) Notice: Subject to any disclaimer, the term of this patent is extended or adjusted under 35 U.S.C. 154(b) by 217 days.

(21) Appl. No.: 10/687,206

(22) Filed: Oct. 16, 2003

(65) Prior Publication Data

US 2005/0081353 A1  Apr. 21, 2005

(51) Int. Cl.
  *A41H 43/00* (2006.01)
(52) U.S. Cl. ...................................... 223/50
(58) Field of Classification Search .................. 223/50, 223/101–105, 99; 297/218.1, 218.4, 226, 297/228.11
  See application file for complete search history.

(56) References Cited

U.S. PATENT DOCUMENTS

| 587,123 | A | * | 7/1897 | Holcomb | 223/101 |
| 1,619,142 | A | | 3/1927 | Lippard | |
| 3,003,816 | A | * | 10/1961 | Wilson | 297/228.11 |
| 3,312,380 | A | * | 4/1967 | Wages | 223/107 |
| 4,671,437 | A | * | 6/1987 | Sauger | 223/103 |
| 5,353,972 | A | | 10/1994 | Mandel | |
| 5,447,260 | A | * | 9/1995 | Beddow | 223/50 |
| 5,524,800 | A | * | 6/1996 | Arney | 223/50 |
| 5,785,215 | A | * | 7/1998 | Hinkel | 223/50 |
| 5,820,213 | A | * | 10/1998 | Severinski | 297/218.5 |
| 6,612,648 | B1 | * | 9/2003 | Hashiguchi | 297/218.1 |

* cited by examiner

Primary Examiner—Gary L. Welch

(57) ABSTRACT

A drawstringing kit including a needle and a guard is disclosed. The needle includes an eyelet for receiving a drawstring. A tunnel of the damaged product is adapted to receive the needle to facilitate stringing of the drawstring through the tunnel. The guard is positioned about at least a portion of a perimeter of the damaged product. A method for repairing an automotive seat assembly is also disclosed. The method includes the steps of removing a damaged, originally-manufactured drawstring from a tunnel of a seat cover; restringing a replacement drawstring through the tunnel; positioning the seat cover over the seat assembly; and maintaining structural integrity of the replacement drawstring and tunnel. An apparatus for repairing an automotive seat assembly is also disclosed. The apparatus includes drawstringing means including a drawstring retention means and means for maintaining structural integrity of the replacement drawstring.

6 Claims, 8 Drawing Sheets

DRAWSTRINGING KIT

TECHNICAL FIELD

The present invention relates to a kit for the reparation of damaged products, and in particular to a kit for the reparation of a damaged product, such as an automotive seat cover, that includes a drawstring.

BACKGROUND OF THE INVENTION

As seen in FIG. 1, it is known that an automotive seat assembly, which is seen generally at 10, typically comprises a pair of track members 12 that function in moving a seat frame 14 and back frame 16 forward and backward in the vehicle cabin to accommodate passengers or drivers of various heights. It is also known in the art that the track members 12 support a seat pan 18, which comprises a generally rigid, metallic frame. The comfort of the passenger or driver may be further enhanced by providing a seat pan pitch adjustment mechanism 20 (FIG. 2). The pitch adjustment mechanism 20 may be electrically-driven such that the user may push or press a button (not shown) located about the base of the seat frame 14 to activate a motor (not shown) to adjust the pitch of the seat pan 18. Alternatively, the pitch adjustment mechanism 20 may be mechanically-driven such that a user may pull or push a handle (not shown) to raise or lower the seat pan 18.

In an effort to provide additional comfort for the passenger or driver, while also functioning in hiding the structure and other mechanical components of the track members 12, seat frame 14, and seat pan 18, it has become common practice in the art to provide a cushion 22 (FIG. 1) positioned over the seat pan 18 and an aesthetically-pleasing trim 24 over the cushion 22. Typically, the material comprising the aesthetically-pleasing trim 24 has been selected from the group consisting of a fabric-material, leather, or artificial leather. The aesthetically-pleasing trim 24 has been typically applied over the cushion 22 via a plurality of well known processes such as gluing, foaming-in-place, molding-in-place, or drawstringing.

As known in the art, drawstringing involves the use of a string or cord, which is herein after referred to as a drawstring 26, that is fed through a passage, which is hereinafter referred to as a tunnel 28, that is integral with, formed on, or stitched to an applied material, such as the aesthetically pleasing trim 24. The combination of the tunnel 28 and the aesthetically pleasing trim 24 is hereinafter referred to as a seat cover 30. The material comprising the tunnel 28 is typically selected from a stretchable, elastic material, such as nylon or the like.

The seat cover 30 is typically formed by first stitching the tunnel 28 about the drawstring 26, leaving the first free end 26a and the second free end 26b of the drawstring 26 exposed at respective ends 28a, 28b of the tunnel 28. Then, upon securing the drawstring 26 about the tunnel 28, the tunnel 28 is stitched about a perimeter 32 of the aesthetically pleasing trim 24. Then, the seat cover 30 is positioned over and wrapped about the applied medium, which is the cushion 22. Upon pulling the drawstring 26 at one or both of its respective ends 26a, 26b, the tunnel 28 draws and tightens the aesthetically pleasing trim 24 about the cushion 22.

Although adequate for most situations, the aesthetically pleasing trim 24 may be disturbed from its originally-manufactured state. For example, the constant entering and exiting of the vehicle may undesirably cause the aesthetically pleasing trim 24 to shift about the cushion 22, loosening the drawstring 26. Even further, different vehicle occupants may adjust the pitch of the seat pan 18 by adjusting the pitch adjustment mechanism 20, which may also disturb the aesthetically pleasing trim 24 from its originally-manufactured state. For example, as seen in FIG. 3, the seat cover 30 is located proximate to the pitch adjustment mechanism 20, and as seen more clearly in FIG. 4, upon adjusting the pitch of the seat pan 18, the tunnel 28 and/or the drawstring 26 may undesirably interact with pitch adjustment mechanism 20, becoming disposed about first and second jaw portions 20a, 20b, of the pitch adjustment mechanism 20.

Over time, as seen in FIG. 5, the integrity of the drawstring 26 and/or tunnel 28 may become damaged, considerably degrading the performance of the drawstring 26 as a result of the undesirable interaction described above to the point where the drawstring 26 may no longer provide tension about the cushion 22. Thus, the failure of the drawstring 26 and/or tunnel 28 causes the seat cover 30 to become loose, exposing the mechanical components of the track members 12, seat frame 14, and seat pan 18. Not only is the exposure of the mechanical components of the track members 12, seat frame 14, and seat pan 18 unsightly, the aesthetically pleasing trim 24 may be further damaged by other sharp edges of the mechanical components (not shown).

If the drawstring 26 fails in such a manner, the seat cover 30, cushion 22, and in some situations, the seat pan 18, are typically discarded and replaced, resulting in excessive waste of materials that may not necessarily be damaged, such as the cushion 22 and seat pan 18. Thus, repair to the automotive seat assembly 10 would require new materials and require a skilled technician to disassemble the seat assembly 10 to replace the seat cover 30, cushion 22, and in some situations, the seat pan 18. As a result, the vehicle's owner is inconvenienced with having to take the vehicle in to a designated repair shop for service while also paying for costly repair fees including labor and materials.

Therefore, a need exists for an apparatus and method for repairing a damaged product, and in particular to the reparation of a damaged product including a drawstring, which may be applied to an automotive seat assembly.

SUMMARY OF THE INVENTION

The inventor of the present invention has recognized these and other problems associated with conventional automotive seat assemblies. To this end, the inventor has developed a drawstringing kit including a needle and a guard. The needle includes an eyelet for receiving a drawstring. A tunnel of the damaged product is adapted to receive the needle to facilitate stringing of the drawstring through the tunnel. The guard is positioned about at least a portion of a perimeter of the damaged product.

A method for repairing an automotive seat assembly is also disclosed. The method includes the steps of removing a damaged, originally-manufactured drawstring from a tunnel of a seat cover; restringing a replacement drawstring through the tunnel; positioning the seat cover over the seat assembly; and maintaining structural integrity of the replacement drawstring and tunnel.

An apparatus for repairing an automotive seat assembly is also disclosed. The apparatus includes drawstringing means including a drawstring retention means and means for maintaining structural integrity of the replacement drawstring.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
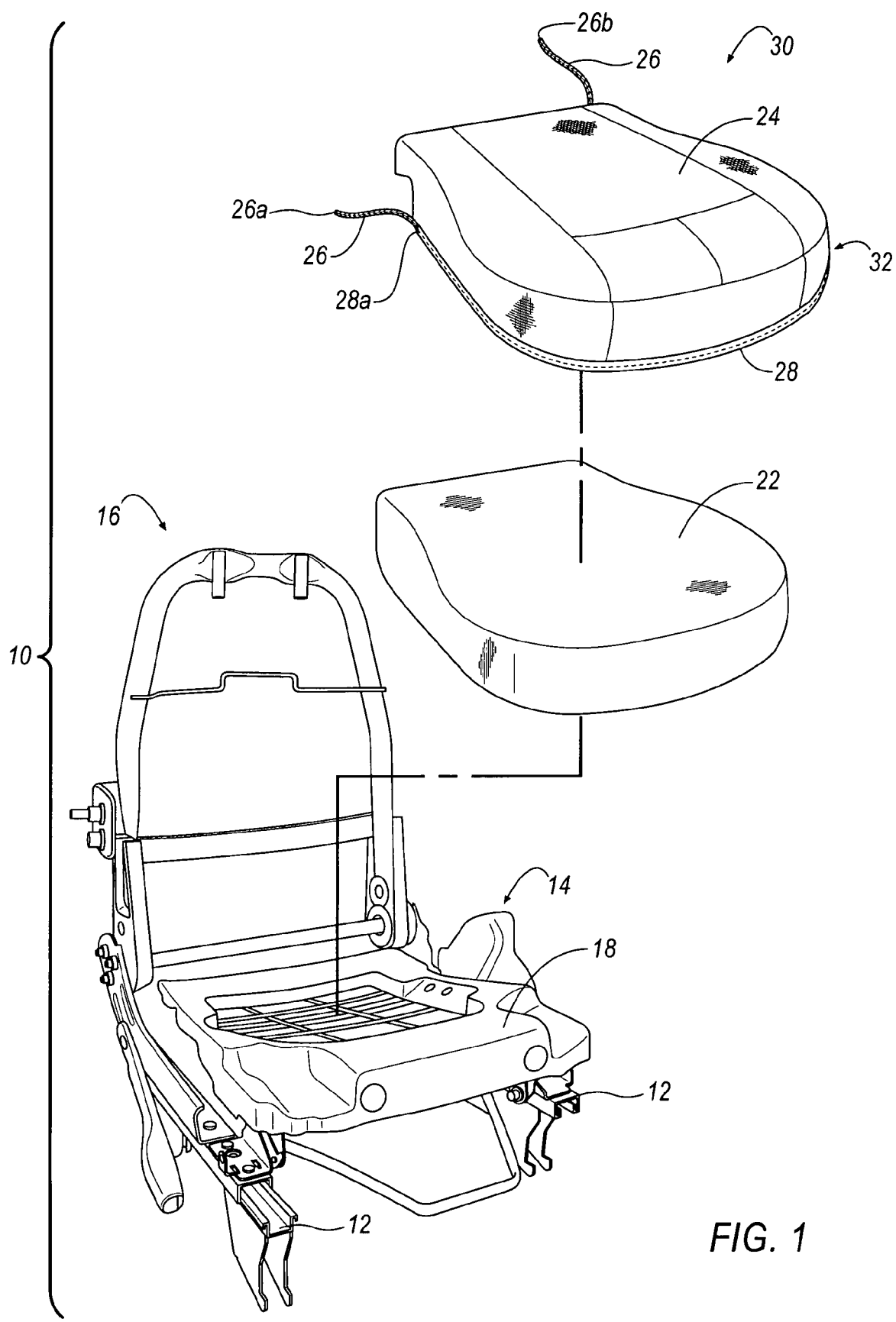
FIG. 1 is a perspective view of a seat assembly.
Figure 2:
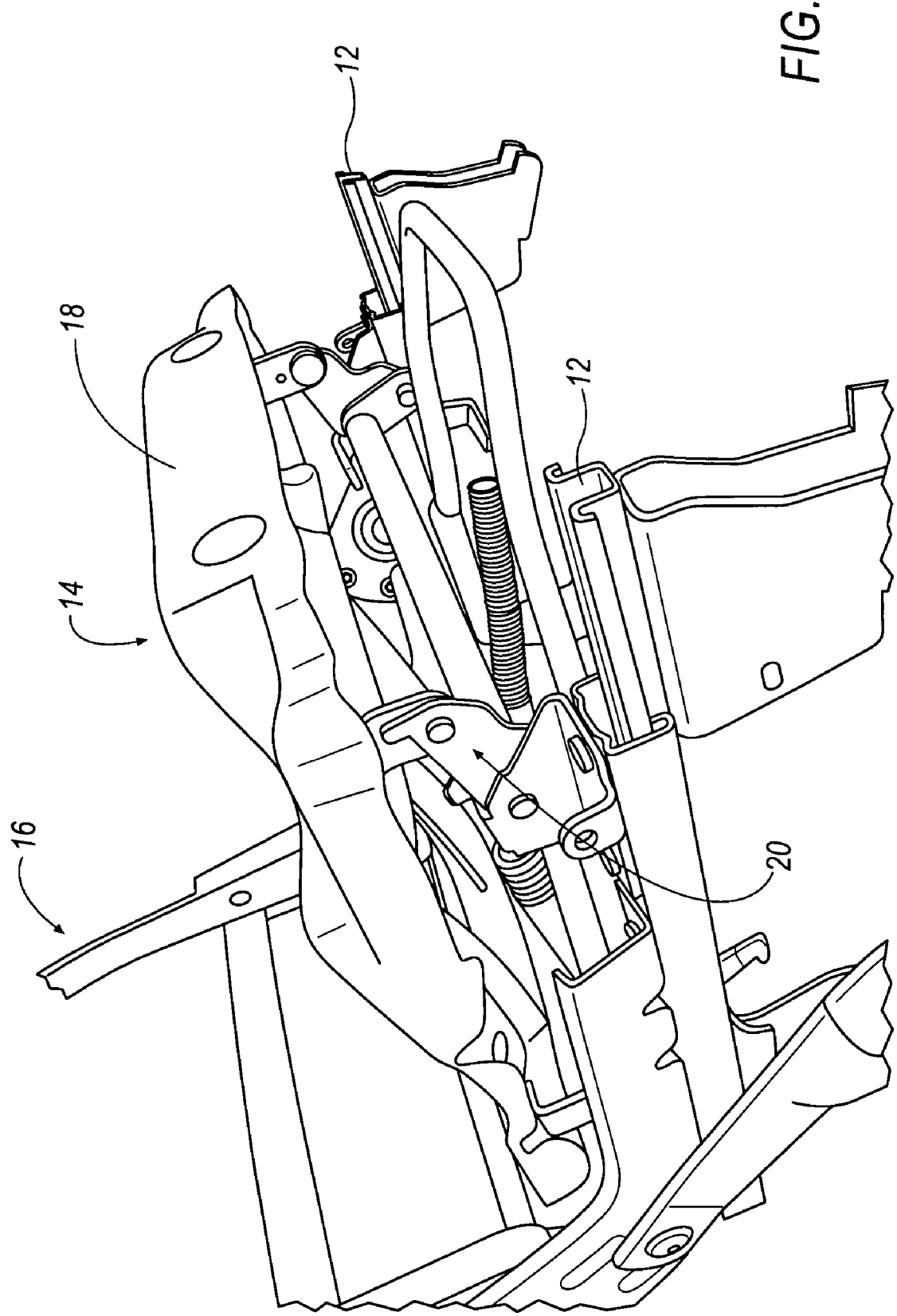
FIG. 2 is another view of the seat assembly according to FIG. 1, illustrating a seat pan pitch adjustment mechanism.
Figure 3:
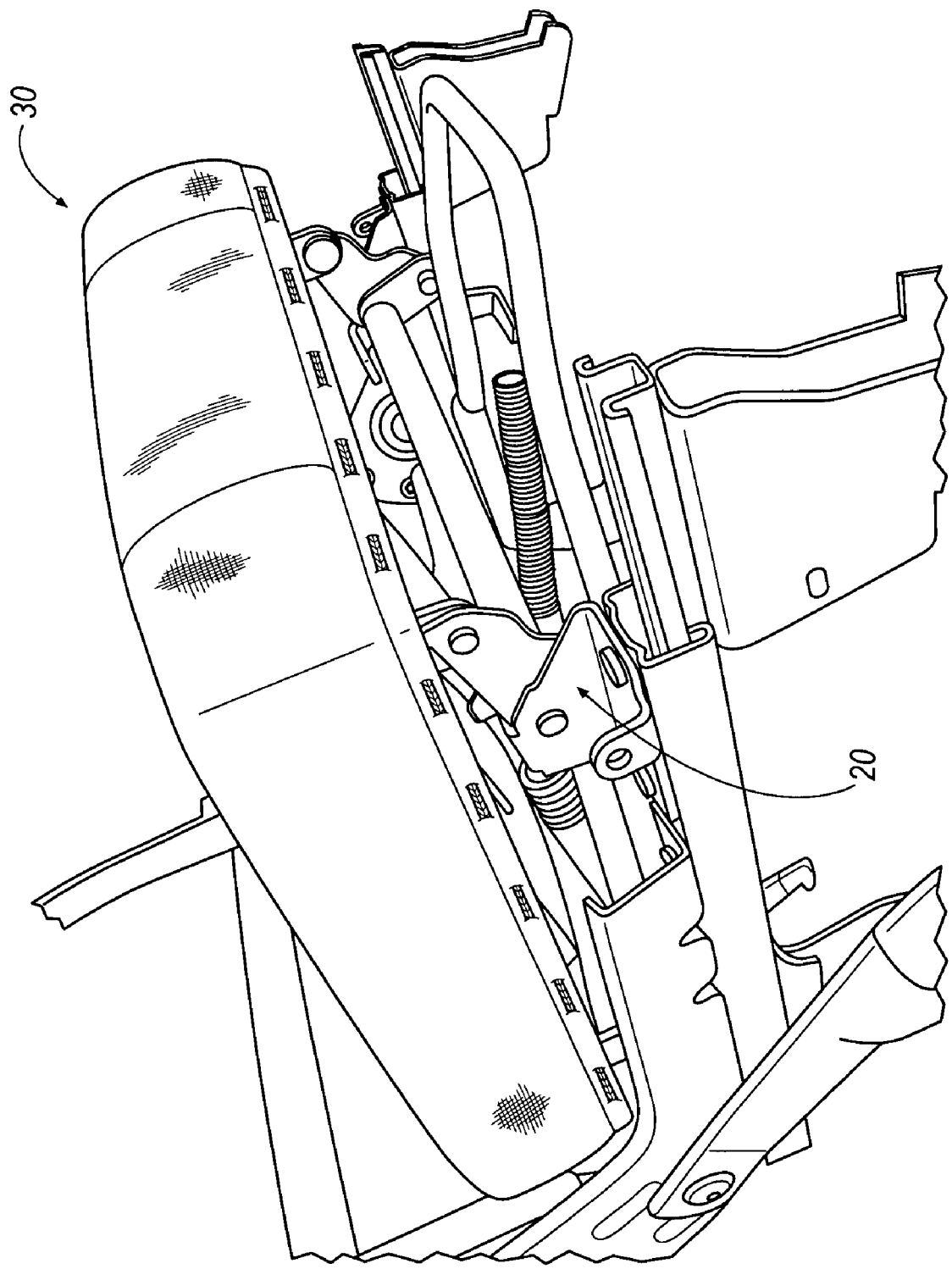
FIG. 3 is an alternative view of the seat assembly according to FIG. 2, illustrating a seat cover positioned about the seat pan pitch adjustment mechanism.
Figure 4:
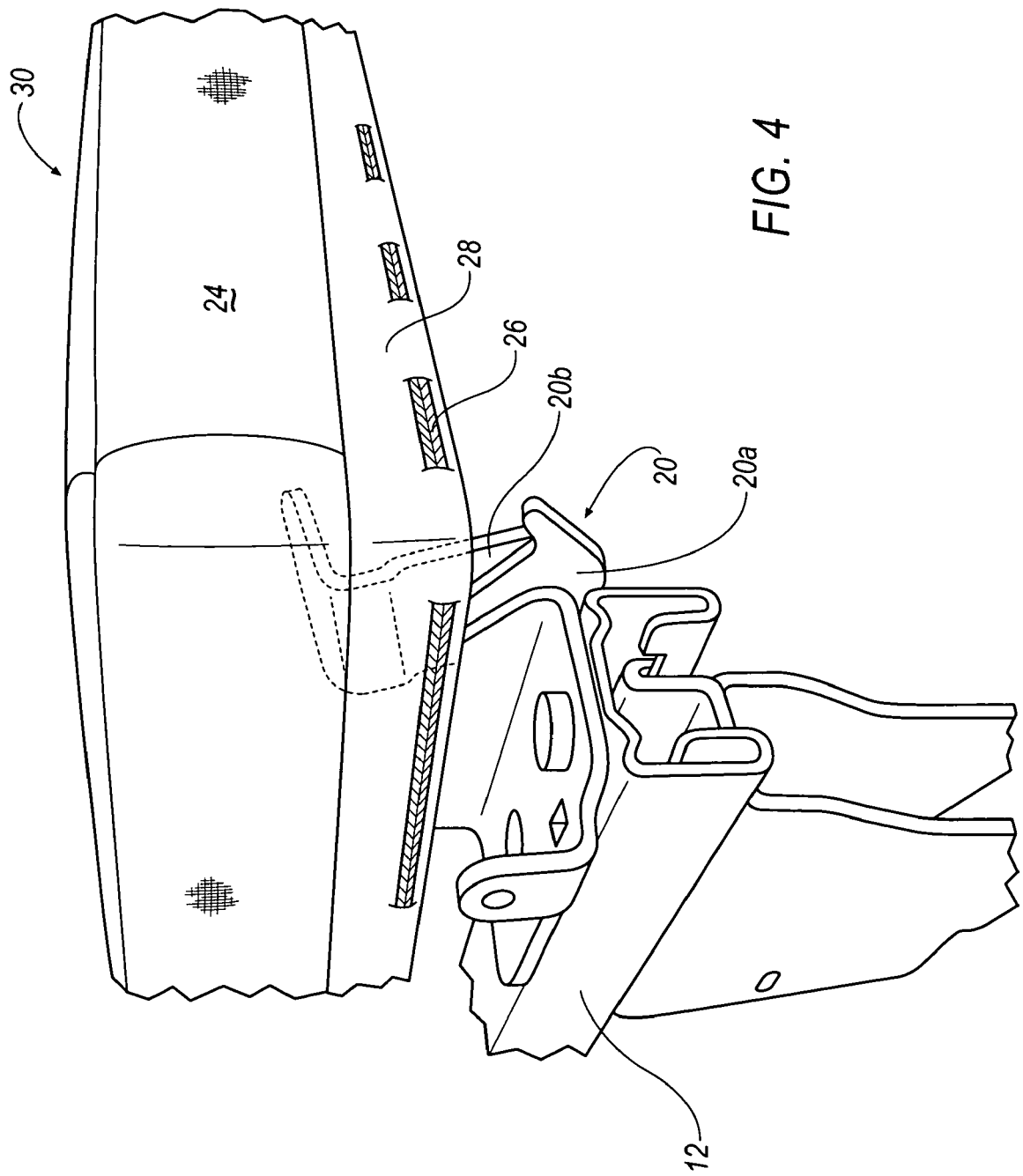
FIG. 4 is a view of the seat cover according to FIG. 3, illustrating a drawstring and tunnel interacting with the seat pan pitch adjustment mechanism.
Figure 5:
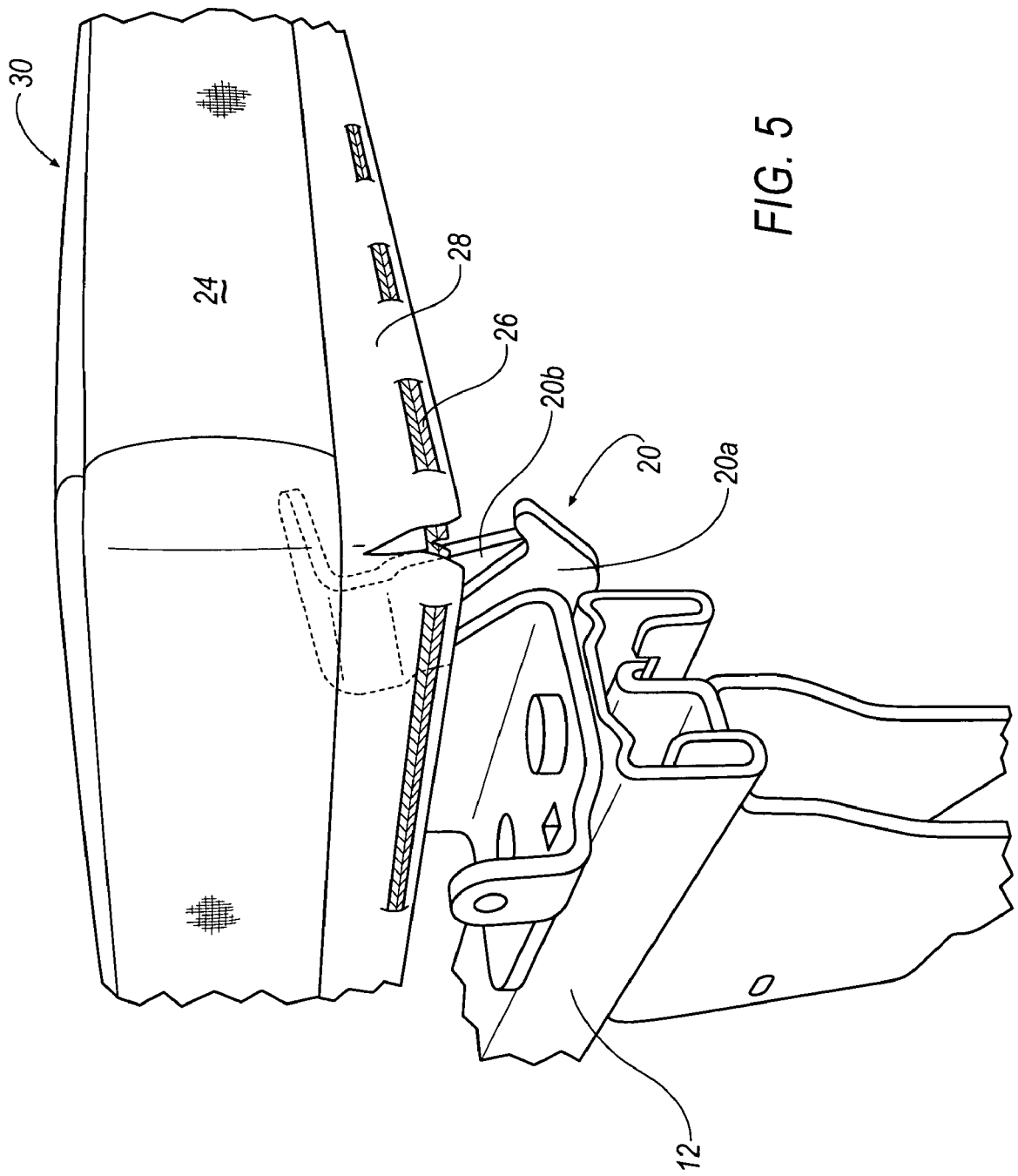
FIG. 5 is another view of the drawstring and tunnel interacting with the seat pan pitch adjustment mechanism according to FIG. 4.
Figure 6:
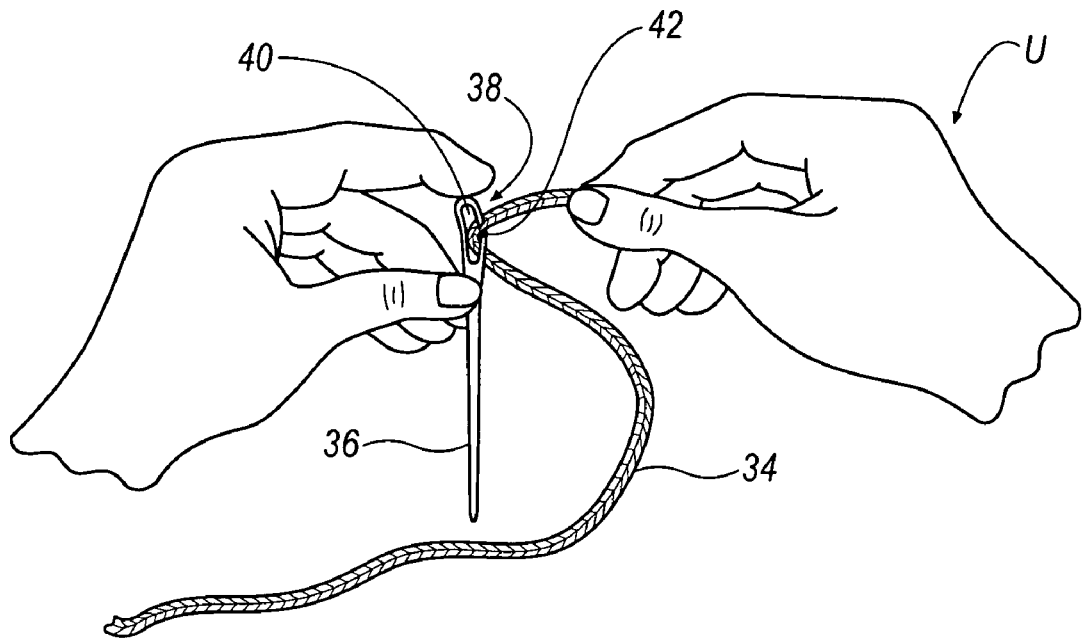
FIG. 6 is a perspective view of a replacement drawstring being secured to a drawstringing apparatus according to one embodiment of the invention.

Referring to FIG. 6, a perspective view of a drawstring 34 being secured to a drawstringing means 36 by a user, U, is illustrated according to one embodiment of the invention. It is contemplated that the drawstring 34 and drawstringing means 36 is applied to the seat cover 30 as described above in relation to FIGS. 1–5. However, the inventor of the present invention also contemplates that the inventive drawstringing means 36 and drawstring 34 may also be used in the original manufacturing of the seat cover 30. Even further, it is also contemplated by the inventor that the inventive drawstring 34 and drawstringing means 36 is not limited to an automotive application as described in relation to FIGS. 1–10 and may also be applied to other non-automotive applications including a drawstring in the manufacturing of any drawstring-based product or a drawstring used in any drawstring-based product that becomes damaged, resulting in the failure of providing tension about an applied medium.

The drawstringing means 36, which is hereinafter referred to as a needle 36, includes a drawstringing retention means 38. The drawstring retention means 38 is further defined by an eyelet 40, which is further defined an eyelet slit 42. The needle 36 may include any desirable flexible material, such as a thermoplastic resin, that facilitates opening of the eyelet 40 about the eyelet slit 42. By flexing open the eyelet 40, a user, U, may locate and secure the drawstring 34 in the eyelet 40, whereas the drawstring 34 is defined to have a larger diameter than the opening of the eyelet 40. Preferably, the eyelet 40 frictionally engages the drawstring 34 and provides adequate force about the drawstring 34 to prevent the drawstring 34 from disengaging the needle 36. According to another embodiment of the invention, upon securing the drawstring 34 in the eyelet 40, the user, U, may wrap a piece of tape (not shown) about the eyelet 40 to provide additional reinforcement to the eyelet 40 in preventing the drawstring 34 from disengaging the needle 36.

In accordance with the following description of the invention, the drawstring 34 is hereinafter referred to as a replacement drawstring 34 to provide accurate terminology in describing the invention and differentiating that of the originally-manufactured drawstring 26 that failed as applied in the description relating to FIGS. 1–5. However, as described above, it is also contemplated that while the inventive nature of the invention is directed to the inventive concept of restringing a drawstring, the inventor of the present invention recognizes that it is also possible to manufacture any desirable drawstring-based product as mentioned above using the same techniques described below in relation to FIGS. 6–10 although the drawstring relating to the present invention is designated as replacement drawstring.

Figure 7:
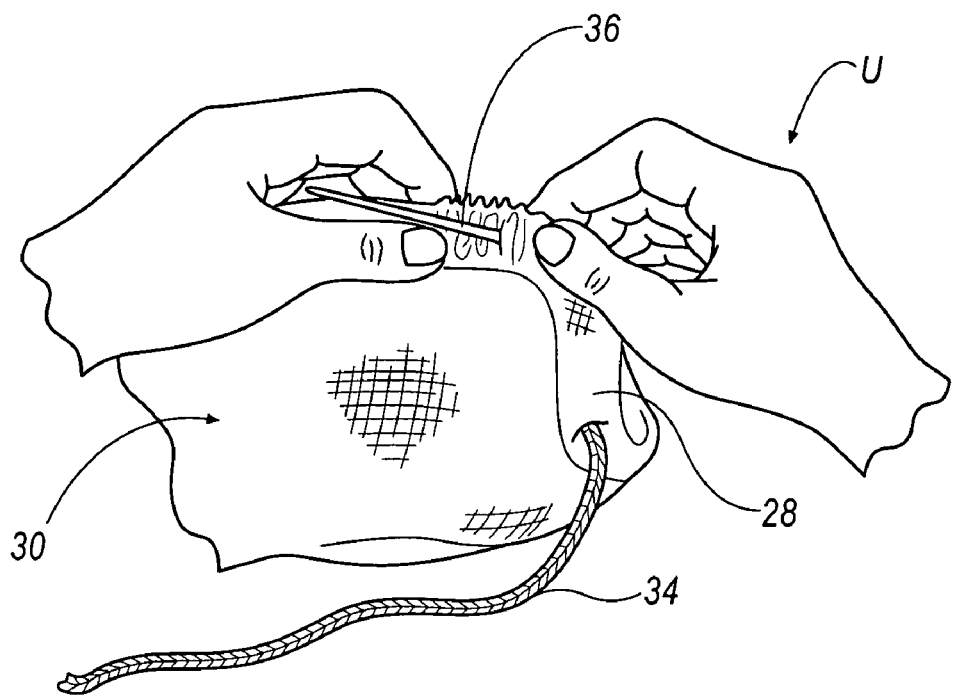
FIG. 7 is a perspective view of the drawstringing apparatus according to FIG. 6 being inserted into a tunnel.

As seen in FIG. 7, the user, U, may restring the replacement drawstring 34 about a drawstring retention provision 28, such as the above-described tunnel 28 of the seat cover 30. According to the illustrated embodiment, the tunnel 28 preferably comprises a plurality of individual tunnels 28 (FIG. 8) stitched about a strip of elastic material. By providing a plurality of tunnels 28, the user, U, may easily string the replacement drawstring 34 about the perimeter 32 of the aesthetically pleasing trim 24 without having to string the replacement drawstring 34 in a blind application where the user may simply feel the location of the replacement drawstring 34 about the perimeter 32 as the replacement drawstring 34 is fed through the tunnels 28. Upon fully stringing the replacement drawstring 34, the needle 36 is detached from the replacement drawstring 34.

Figures 8, 9:
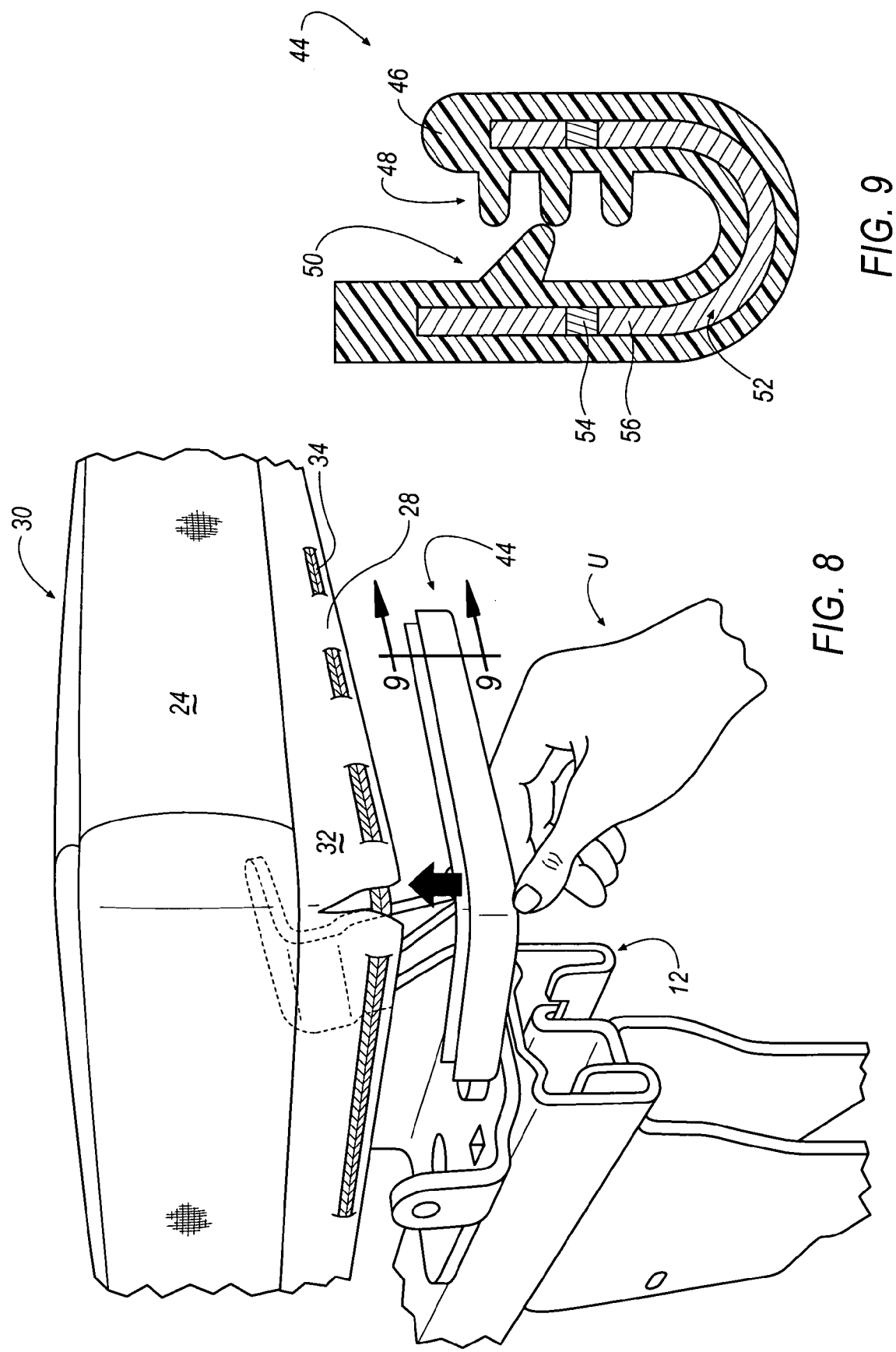
FIG. 8 is a perspective view of a guard being positioned over selected portion of the tunnel.
FIG. 9 is a cross-sectional view of the guard according to FIG. 8.

Then as seen in FIG. 8, the user, U, positions a means for maintaining structural integrity of the replacement drawstring 34, which is hereinafter referred to as a guard 44. The guard 44 is further defined to include a length of flexible material conformable to bend about any applied contour of the perimeter 32. Referring also to FIG. 9, the guard 44 comprises an outer material 46 including a U-shape with inwardly facing opposing ribs 48, 50 that frictionally grip the tunnel 28. As illustrated in FIG. 9, a plurality of ribs 48 perpendicularly extend from and are integral with the outer material 46 as the rib 50 extends angularly from and is integral with the outer material 46. The outer material 46 is reinforced by a U-shaped core, which is designated generally at 52.

The outer material 46 may be rubber, or the like, and according to the illustrated embodiment of the invention, the core material 52 may include any desirable flexible metal or plastic. More specifically, as seen in FIG. 9, the core material 52 may be a combination of flexible metal and plastic, which is seen generally at reference numerals 54 and 56, respectively. The core material designated at reference numeral 54 may be a pair of wires, and the core material designated at reference numeral 56 may be any desirable thermoplastic resin. The outer material 46 may be extruded over the core material 52, or alternatively, the outer material 46, may be co-extruded at the same time with the core material 52.

The general U-shape of the guard 44 generally covers the tunnel 28, completely covering exposed and unexposed portions of the replacement drawstring 34. Functionally, the guard 44 is applied over a selected portion of the perimeter 32 where damage to the original drawstring 26 and/or tunnel 28 previously occurred or is likely to occur as a result of the interaction of a foreign component with respect to the seat cover 30, such as the pitch adjustment mechanism 20. Although the length of the guard 44 is shown to provide protection about a selected portion of the perimeter 32, the length may be any desirable dimension such that the guard 44 may protect the entire perimeter 32 of the seat cover 30.

Figure 10:
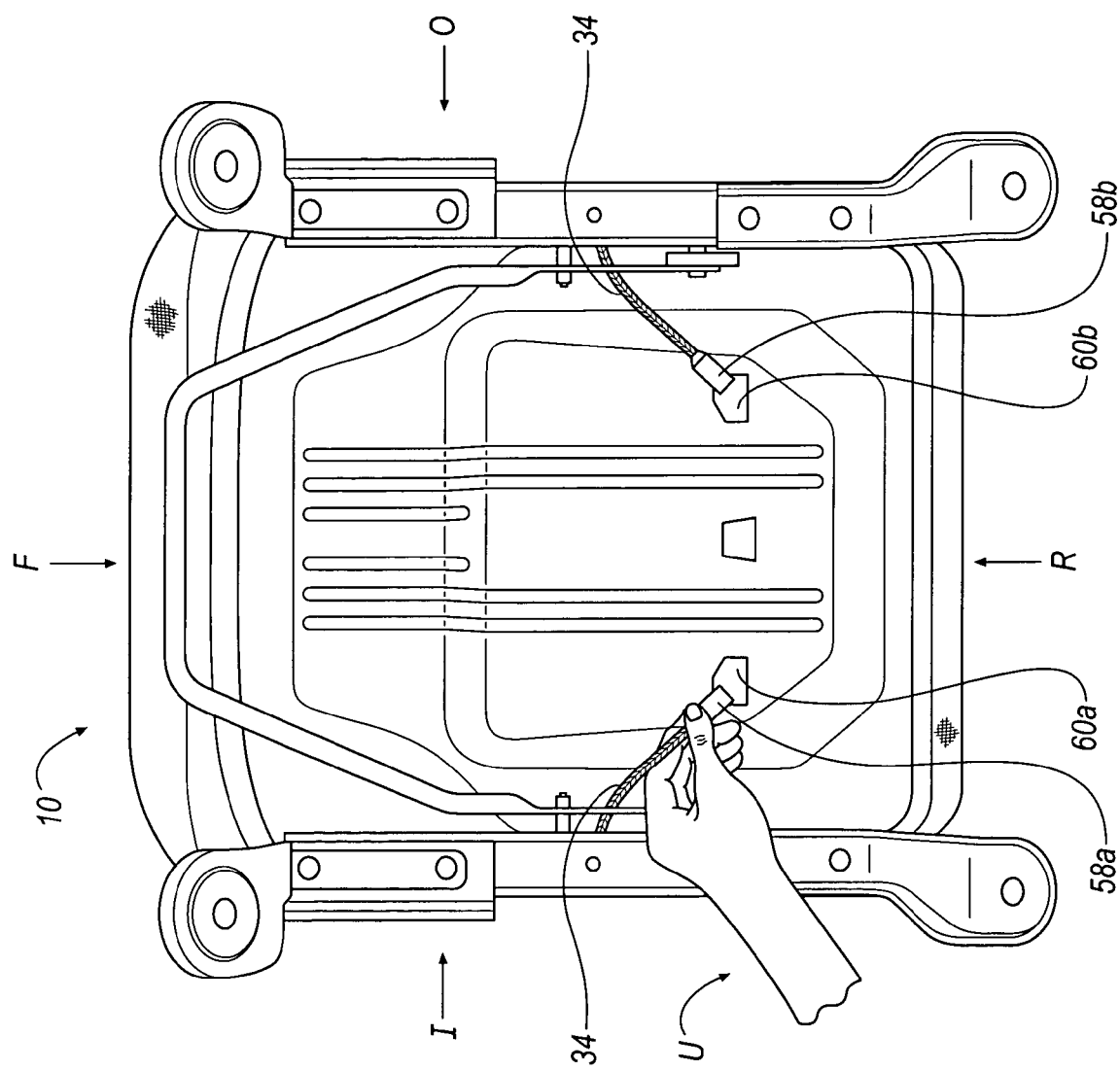
FIG. 10 is a perspective view of the drawstring and anchoring portion being anchored and tensioned about an underside of a seat pan according to FIG. 1.

As shown in FIG. 10, once the guard 44 is properly positioned as described above, the user, U, positions a drawstring anchoring means, such as a hooks 58a, 58b at each end of the replacement drawstring 34. The hooks 58a, 58b may comprise any desirable material, such as plastic or metal, and may be any desirable shape to function in the anchoring of the replacement drawstring 34 to the seat pan 18. According to one embodiment of the invention, the hooks 58a, 58b may include an S-shape, such that the replacement drawstring 34 may be looped and knotted about a first part of the S-shape while the opposing end of the S-shape hooks about a hook-receiving means 60a, 60b located on the underside of the seat pan 18.

In operation, the user, U, may loop and knot a first end of the replacement drawstring 34 about the first hook 58a, hook the first hook 58a about the first hook receiving means 60a, draw the replacement drawstring 34 into tension, loop and knot the second end of the replacement drawstring 34 about the second hook 58b, and lastly hook the second hook 58b about the second hook receiving means 60b. Excess slack of the replacement drawstring 34 may be trimmed off upon securing the second hook 58b. Although the above-described operation includes two hooks 58a, 58b located about inboard and outboard sides, I, O, of the seat assembly 10, additional hooks may be located about the underside of the seat pan 18 at the front, F, and/or rear, R, to pull midsections of the replacement drawstring 34 into tension to enhance the tensioning of the seat cover 30.

It should be understood that the aforementioned and other various alternatives to the embodiments of the invention described herein may be employed in practicing the invention. It is intended that the following claims define the scope of the invention and that the method and apparatus within the scope of these claims and their equivalents be covered thereby.

What is claimed is:

1. A drawstringing kit for attaching a drawstring through a tunnel of a trim cover, said drawstringing kit comprising:
    a flexible needle including an eyelet for receiving a drawstring, to facilitate stringing of the drawstring through the tunnel, said needle including an eyelet slit that facilitates opening of the eyelet to secure a first end of the drawstring in the eyelet, wherein the drawstring includes a larger diameter than the opening of the eyelet such that the eyelet frictionally engages the drawstring and prevents the drawstring from disengaging from the needle; and
    a guard adapted to cover at least a portion of the tunnel, said guard including an outer U-shaped material reinforced by an inner U-shaped core, a plurality of ribs extending perpendicularly inwardly from and integral with the outer material, and an opposing singular rib extending angularly from and integral with the outer material to provide friction about the tunnel;
    wherein the outer material includes rubber and the core includes a flexible metal or plastic.

2. The drawstringing kit according to claim 1, wherein the core comprises a pair of wires and a thermoplastic resin.

3. A drawstringing kit for attaching a drawstring through a tunnel of a trim cover, said drawstringing kit comprising:
    a needle including an eyelet for receiving a drawstring to facilitate stringing of the drawstring through the tunnel;
    a guard adapted to cover at least a portion of the tunnel; and
    hooks positioned at each end of the drawstring to anchor the drawstring to a seat pan, wherein the hooks include an S-shape, such that each drawstring end may be looped and knotted about a first part of the hook while a second part of the hook hooks about a hook-receiving means located on the underside of the seat pan.

4. An apparatus for repairing an automotive seat assembly comprising:
    drawstringing means including a drawstring retention means;
    drawstring anchoring means;
    hook receiving means located about an underside of a seat pan to facilitate tensioning of the replacement drawstring; and
    means for maintaining structural integrity of the replacement drawstring.

5. The apparatus for repairing an automotive seat assembly according to claim 4, wherein the drawstringing means includes a needle and the drawstring retention means includes an eyelet and eyelet slit that facilitates opening of the eyelet to secure a first end a drawstring in the eyelet, wherein the drawstring includes a larger diameter than the opening of the eyelet such that the eyelet frictionally engages the drawstring and prevents the drawstring from disengaging the needle, wherein a tunnel is adapted to receive the needle to facilitate stringing of the drawstring through the tunnel about a perimeter of a seat cover.

6. The apparatus for repairing an automotive seat assembly according to claim 5, wherein the means for maintaining structural integrity of the replacement drawstring includes a guard having a length of material that is applied over a selected portion of the tunnel where damage to an originally-manufactured drawstring occurred.

* * * * *